United States Patent
Tanaka et al.

[11] Patent Number: 6,074,318
[45] Date of Patent: Jun. 13, 2000

[54] LOW-NOISE ROLLER CHAIN HAVING ROLLERS WHICH INCLUDE ELASTIC MEMBER PROTRUSIONS TO PREVENT COLLISION OF THE ROLLERS WITH INNER PLATES

[75] Inventors: Koji Tanaka; Takahisa Ando, both of Osaka, Japan

[73] Assignee: Tsubakimoto Chain Co., Osaka-fu, Japan

[21] Appl. No.: 08/819,808

[22] Filed: Mar. 18, 1997

[30] Foreign Application Priority Data

Mar. 22, 1996 [JP] Japan ................................ 8-065937

[51] Int. Cl.⁷ ............................ F16G 13/02; F16H 55/06
[52] U.S. Cl. ........................ 474/207; 474/161; 474/226; 474/156
[58] Field of Search ................ 474/91, 206, 226, 474/155, 156, 231, 161, 207; 384/220, 385, 396

[56] References Cited

U.S. PATENT DOCUMENTS

| | | | |
|---|---|---|---|
| 308,223 | 11/1884 | White ........................ | 384/385 |
| 898,851 | 9/1908 | Duff .......................... | 384/385 |
| 1,346,682 | 7/1920 | Reinoehl .................... | 384/396 |
| 2,103,729 | 12/1937 | Leighton .................... | 403/224 |
| 2,113,980 | 4/1938 | Brill ........................... | 474/91 |
| 2,411,207 | 11/1946 | Hait ........................... | 474/91 X |
| 2,816,453 | 12/1957 | Frank et al. ................ | 474/207 |
| 3,152,846 | 10/1964 | Dumpis ...................... | 384/220 |
| 3,362,765 | 1/1968 | Pierce ......................... | 384/125 |
| 3,428,345 | 2/1969 | Ryszewski .................. | 403/165 |
| 3,492,885 | 2/1970 | Nolte .......................... | 474/91 |
| 3,643,517 | 2/1972 | Paul ............................ | 474/91 |
| 3,904,008 | 9/1975 | Sonnerat ..................... | 192/98 |
| 4,261,214 | 4/1981 | Watanabe et al. ........... | 474/156 |
| 4,343,519 | 8/1982 | Schulz et al. ............... | 384/220 |
| 4,435,661 | 3/1984 | Witten ........................ | 310/90 |
| 4,615,171 | 10/1986 | Burk ........................... | 474/206 X |
| 5,013,166 | 5/1991 | Domer ........................ | 384/220 |
| 5,222,920 | 6/1993 | Cheesman et al. .......... | 474/213 |
| 5,425,679 | 6/1995 | Utz .............................. | 474/91 |
| 5,439,421 | 8/1995 | Tanaka ........................ | 474/206 |

FOREIGN PATENT DOCUMENTS

| | | | |
|---|---|---|---|
| 2843562 | 4/1979 | Germany .................... | 474/91 |
| 61-37894 | 11/1986 | Japan . | |
| 2-15067 | 4/1990 | Japan . | |
| 1441115 | 11/1988 | U.S.S.R. ..................... | 474/156 |

*Primary Examiner*—Daniel P. Stodola
*Assistant Examiner*—Gregory J. Strimbu
*Attorney, Agent, or Firm*—Armstrong, Westerman, Hattori, McLeland and Naughton

[57] ABSTRACT

A roller chain (10) for reducing noise and vibration generated during engagement of the roller chain with a sprocket. The roller chain (10) has a plurality of inner link assemblies, each including a bushing (12) and inner plates (14) connected together and a plurality of outer link assemblies, each including a pin (16) and outer plates (18) connected together with the pins (16) extending through the bushings (12). The roller chain (10) further has rollers (20) respectively fitted on the bushings (12). The rollers (20) are each shorter than the spacing between the opposed inner plates (14). An elastic member (22) is fixed to the inner or outer peripheral surface of each roller (20). The elastic member (22) has projecting portions (24) projecting from both end faces of the roller and facing inside surfaces of the associated inner plates (14) to prevent collision of the roller (20) with the inner plates. In one embodiment, the projecting portions (24) have a shape whose thickness gradually decreases toward the inside surfaces of the inner plates (14). Each projecting portion (24) is formed so as to leave a slight clearance between it and the inside surface of the inner plate (14) opposed thereto. The roller (20) is rotatable on the bushing (12).

7 Claims, 4 Drawing Sheets

LOW-NOISE ROLLER CHAIN HAVING ROLLERS WHICH INCLUDE ELASTIC MEMBER PROTRUSIONS TO PREVENT COLLISION OF THE ROLLERS WITH INNER PLATES

BACKGROUND OF THE INVENTION

1. Field of the Invention

The present invention relates to a roller chain capable of suppressing noise and vibration which are generated upon abutment of the chain with a sprocket.

2. Description of the Related Art

When a roller chain engages a sprocket, the outer peripheral surface of the roller collides with the tooth surface of the sprocket, and an end face of the roller strikes against an inside surface of an inner plate of the chain, resulting in generation of a noise. In the roller chain disclosed in Japanese Utility Model Publication No. 15067/90, which intends to prevent the said noise, a roller and elastic rings of a rectangular section positioned in a sandwiching relation to the roller are provided axially in series on a bushing which is fitted in inner plates of the chain, the elastic rings being larger in diameter than the roller. When the chain engages a sprocket, the resulting collision sound is absorbed by an elastic deformation of the elastic rings.

However, there arises the problem that the elastic rings when deformed come into abutment with roller edges and the resulting stress concentration on end faces causes breakage of the elastic rings in an early stage. Further, since the area of contact between the elastic rings and the inner plates is large, the resulting frictional resistance is also large, so that the rotation of the elastic rings is obstructed. As a result, the elastic rings undergo a local wear, which eventually leads to breakage of the elastic rings. Thus, the chain no longer exhibits the noise preventing effect.

SUMMARY OF THE INVENTION

The present invention has solved the above-mentioned problems by a roller chain with a roller fitted on a bushing. In this roller chain, an elastic member is fixed to a peripheral surface of the roller, and projecting portions are formed integrally with the said elastic member. The projecting portions project from both end faces of the roller and come into pressure contact with inside surfaces of inner plates of the chain upon abutment of the chain with a sprocket. Further, the projecting portions are gradually decreased in radial thickness toward the said inner plates.

When the chain is entrained on the sprocket, the roller strikes against the sprocket. In the case where the elastic member is fixed to the inner peripheral surface of the roller, the elastic member is held under pressure between the inner peripheral surface of the roller and the outer peripheral surface of the bushing, while in the case where the elastic member is fixed to the outer peripheral surface of the roller, it comes to be pressed between the outer peripheral surface of the roller and the tooth :surface of the sprocket. The elastic member deforms not only radially but also axially.

By a radial deformation of the elastic member the energy of collision between the chain and the sprocket is absorbed and the noise and vibration resulting from the collision are diminished.

At the same time, by an axial deformation of the elastic member, the projecting portions of the elastic member projecting from both end faces of the roller come into pressure contact with the inside surfaces of the inner plates to suppress the generation of noise and vibration. The projecting portions of the elastic member have a gradually decreased thickness. More specifically, the projecting portions have arcuate or tapered ends, which when deformed axially come into pressure contact with the inside surfaces of the inner plates.

DESCRIPTION OF THE PREFERRED EMBODIMENTS

Figure 1:
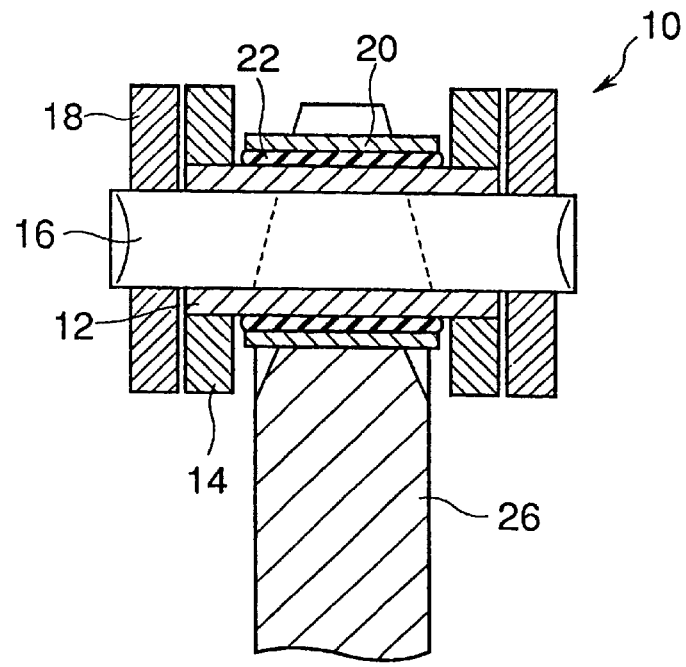
FIG. 1 is a sectional view of a roller chain according to an embodiment of the present invention.
Figure 2:
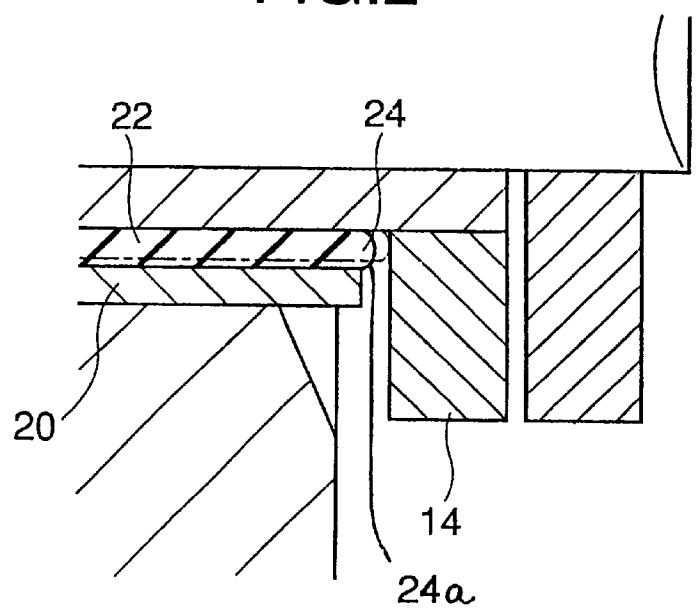
FIG. 2 is an enlarged partial view of the roller chain of FIG. 1.

FIGS. 1 and 2 illustrate a roller chain according to a first embodiment of the present invention. The roller chain, indicated at 10, has a plurality of inner link assemblies each comprising bushing 12 and inner plates 14 both connected together and a plurality of outer link assemblies each comprising pin 16 and outer plates 18 both connected together, the pins 16 extending through the bushings 12. The roller chain 10 further has rollers 20 respectively fitted on the bushings 12, the rollers 20 being each shorter than the spacing between the inner plates 14 opposed to each other.

An elastic member 22 is fixed to the inner peripheral surface of each roller 20 by integral molding or press-fitting. As will be apparent from embodiments to be described later, the elastic member 22 may be fixed to the outer peripheral surface of the roller or may be fixed to both inner and outer peripheral surfaces of the roller. The elastic member 22 has projecting portions 24 projecting from both end faces of the roller and facing inside surfaces of the associated inner plates 14 to prevent collision of the roller 20 with the inner plates. As is clearly illustrated in the drawings, the roller 20 has an axial length which is less than the axial length of the elastic member 22.

The projecting portions 24 have a shape whose thickness gradually decreases (see "projecting portion 24a" in FIG. 12). toward the inside surfaces of the inner plates 14. Although the projecting portions 24 used in this embodiment have arcuate, or R-shaped, ends, they may be in a tapered shape having a truncated cone-like section. Each projecting portion 24 is formed so as to leave a slight clearance between it and the inside surface of the inner plate 14 opposed thereto. The roller 20 is rotatable on the bushing 12. The ends of the projecting portions 24 and the inside surfaces of the inner plates 14 may be contacted with each other insofar as the contact permits easy rotation of the roller 20 relative to the bushing 12, that is, insofar as the contact is a light contact such as a linear contact between the two.

Thus, the end of each projecting portion 24 and the inside surface of the associated inner plate 14 are opposed to each other through a slight clearance or are in light contact with each other, so upon deformation of the elastic member 22 the projecting portion 24 is brought into pressure contact with the inside surface of the inner plate 14. More specifically, when the chain is operated and entrained on a sprocket 26, the outer peripheral surface of the roller 22 comes into mesh with the tooth surface of the sprocket, so that the elastic member 22 deforms as in FIG. 2. This deformation occurs not only radially but also axially.

By a radial deformation of the elastic member 22 the energy of collision between the roller 20 and the sprocket 26 is absorbed and the noise resulting from the collision is suppressed.

The projecting portions 24 each have an arcuate end, so when the projecting portions are not deformed as in the case where the roller is rolling on the tooth surface of the sprocket 26, the projecting portions 24 come irto linear contact with the inner plates 14. Consequently, the frictional resistance becomes smaller and a local wear of the elastic member 22 is prevented, with no fear of breakage of the elastic member. Thus, the noise preventing effect is exhibited over a long period.

Further, since each projecting portion 24 is gradually decreased in its radial thickness toward the inner plate 14 opposed thereto, a space for expansion of the elastic member 22 upon deformation of the same member is formed around the projecting portion 24. Accordingly, the elastic member 22 is not strongly contacted with the inner plate 14 and a local wear thereof is prevented.

FIGS. 3 to 8 illustrate roller chains according to other embodiments of the present invention. In each of these figures are shown only an elastic member and a roller.

Figure 3:
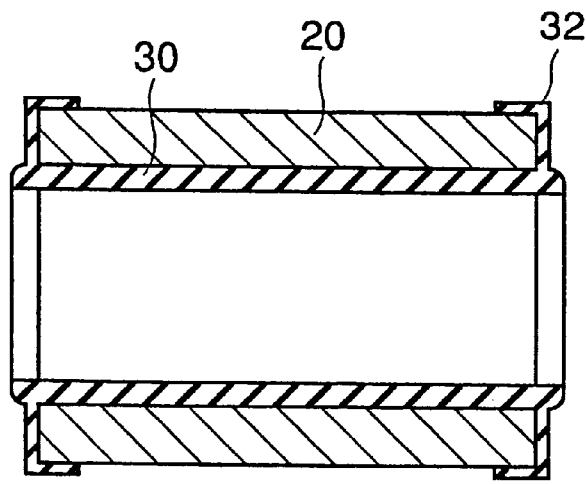
FIG. 3 is a sectional view showing only a roller and an elastic member of a roller chain according to a second embodiment of the invention.

FIG. 3 shows an elastic member 30 integrally formed with retaining portions 32. The retaining portions 32 cover the end faces of a roller 20 and outer peripheral surface portions at both edges of the roller. At every collision of the roller 20 with a sprocket the elastic member 30 deforms also in the axial direction. In this case, since the retaining portions 32 are present, not only it is possible to prevent the elastic member 30 and the roller 20 from coming off each other, but also it is possible to keel) the roller 20 positioned between both end faces of the elastic member 30.

Figure 4:
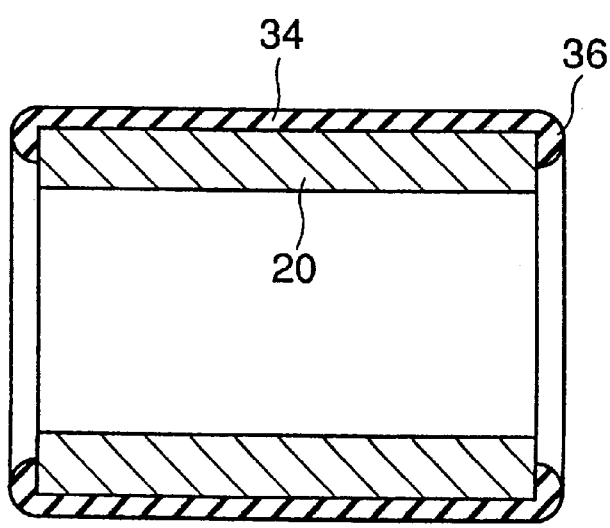
FIG. 4 is a sectional view showing only a roller and an elastic member of a roller chain according to a further embodiment of the invention.

In FIG. 4, an elastic member 34 is fixed to the outer peripheral surface of a roller 20, and projecting portions 36 are projected from and cover part of both end faces of the roller 20. The projecting portions 36 function to prevent the roller 20 from coming off the elastic member and hold the roller in place.

Figure 5:
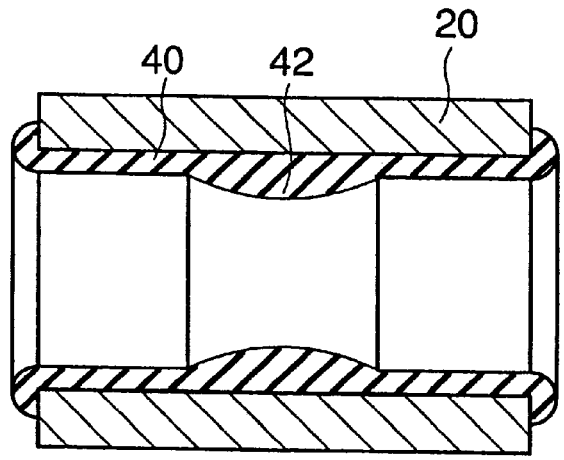
FIG. 5 is a sectional view showing only a roller and an elastic member of a roller chain according to a still further embodiment of the invention.

In FIG. 5, an elastic member 40 is fixed to the inner peripheral surface of a roller 20 and an annular protuberance 42 is formed centrally of the inner peripheral surface of the elastic member 40 to increase the deformability of the elastic member for preventing noise and sliding motion more effectively. The annular protuberance may be formed centrally of the outer peripheral surface of the roller 20.

Figure 6:
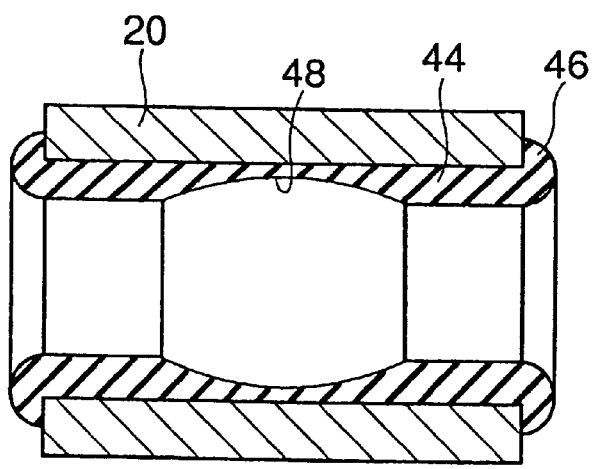
FIG. 6 is a sectional view showing only a roller and an elastic member of a roller chain according to a still further embodiment of the invention.

In FIG. 6, an elastic member 44 is fixed to the inner peripheral surface of a roller 20, projecting portions 46 are projected from and cover part of both end faces of the roller 20, and a sump recess 48 for holding a lubricant is formed centrally of the inner peripheral surface of the elastic member 44. It goes without saying that the recess 48 contributes to improving the lubricating performance of the chain between the outer peripheral surface of the bushing and the inner peripheral surface of the roller 20. In the present invention, moreover, even when the volume of the recess 48 is decreased by deformation of the elastic member 44, the improved lubricating performance of the chain can be maintained over a long period because the projecting portions 46 come into pressure contact with the inner plates and thereby seal the lubricant within the recess 48.

Figure 7:
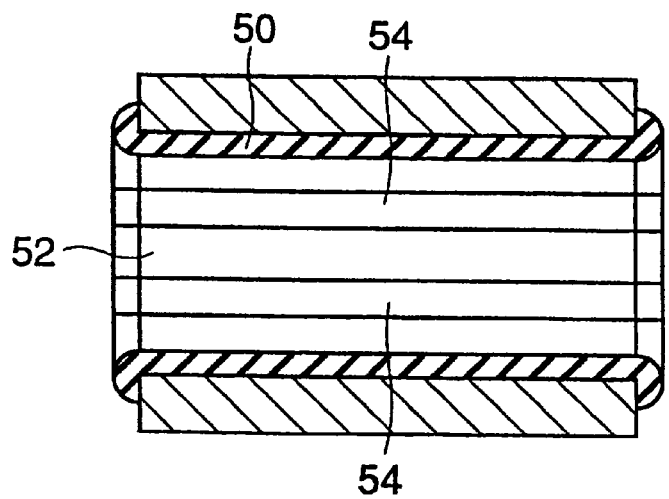
FIG. 7 is a sectional view showing only a roller and an elastic member of a roller chain according to a still further embodiment of the invention.

FIG. 7 shows a modified example of a sump recess for holding a lubricant, in which axial ridge portions 52 are formed on the inner peripheral surface of an elastic member 50, and axial sump recesses 54 are formed on both circumferential sides of each ridge portion 52.

Figure 8:
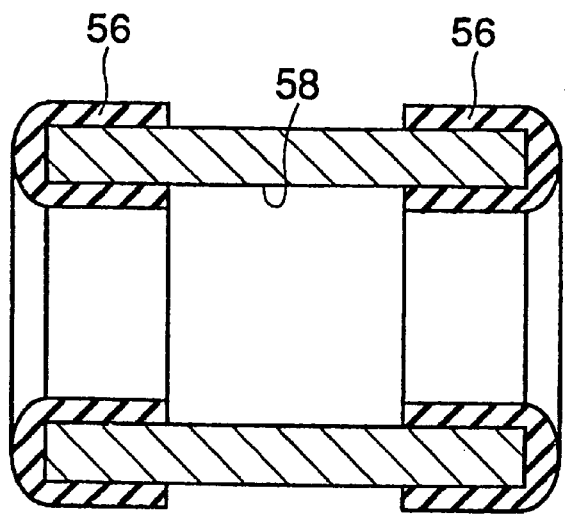
FIG. 8 is a sectional view showing only a roller and an elastic member of a roller chain according to a still further embodiment of the invention.

In FIG. 8, a pair of elastic members 56 are fixed to both inner and outer peripheral surfaces of both end portions of a roller 20 so as to cover not only the said inner and outer peripheral surface portions but al;o the end faces of the roller. A sump recess 58 is formed between the elastic members 56.

Advantage of the Invention

In the present invention, an elastic member is fixed to a peripheral surface of a roller, the elastic member is formed with projecting portions projecting from both end faces of the roller, and the projecting portions are brought into pressure contact with the inside surfaces of inner plates upon engagement of the roller with a sprocket. Accordingly, when the roller engages the sprocket, the elastic member not only deforms radially to absorb the resulting noise and vibration but also deforms axially, so that its projecting portions which come into pressure contact with the inner plates suppress axial vibrations of the roller. Thus, the roller chain can be operated at a low noise.

Further, the projecting portions gradually decrease in radial thickness toward the inner plates, so even if the projecting portions come into contact with the inner plates when the roller is not in mesh with the sprocket or when the roller is rolling on the tooth surface of the sprocket, the contact is a light contact. Therefore, the frictional resistance during rotation of the roller becomes smaller and a local wear of the elastic member is prevented. As a result, there will not occur breakage of the elastic member and hence it is possible to ensure the noise preventing effect over a long period.

According to the invention where the elastic member covers the end faces of the roller, a relative axial movement between the roller and the elastic member is prevented. Consequently, even in the event the roller and the elastic member should come off each other, the roller is kept positioned between the end faces of the elastic member without contact with the inner plates and thus the generation of noise is sure to be prevented.

Further, according to the invention where a sump recess for holding a lubricant is formed in the interior of the roller, not only the lubricating performance of the chain is improved but also even when the volume of the sump recess decreases upon deformation of the elastic member, the projecting portions located outside the recess come into pressure contact with the inner plates of the chain to prevent the lubricant from flowing out and hence the chain can be operated over a long period without the supply of oil.

Moreover, when the elastic member of the invention is formed with an annular protuberance centrally on its peripheral surface, the elastic member becomes more deformable at the time of abutment of the chain with the sprocket, whereby the noise and sliding motion preventing effect can be improved.

What is claimed is:

1. A low-noise roller chain for use with a sprocket, comprising:

a hollow cylindrical bushing;

a pair of inner plates connected to opposite ends of said bushing, respectively;

a roller fitted on said bushing and having opposite ends facing inside surfaces of said inner plates; and an elastic member covering at least part of at least one of an inner peripheral surface and an outer peripheral surface of said roller and having a pair of projecting portions projecting beyond said opposite ends of said roller in an axial direction of said roller, the roller having an overall axial length which is less than an overall axial length of the elastic member, said elastic member being elastically deformable to move said projecting portions into pressure contact with said inside surfaces of said inner plates, respectively, for preventing collision of said roller with said inner plates when said roller chain and said sprocket are engaged together.

2. A low-noise roller chain according to claim 1, wherein said elastic member is fitted to said inner peripheral surface of said roller.

3. A low-noise roller chain according to claim 1, wherein said elastic member is fitted to said inner peripheral surface of said roller and also covers said opposite ends of said roller and portions of said outer peripheral surface adjacent of said opposite ends of said roller.

4. A low-noise roller chain according to claim 1, wherein said elastic member is fitted to said outer peripheral surface of said roller and of said opposite ends of said roller, said portions of said elastic member portions of said elastic member cover portions forming said pair of projecting portions.

5. A low-noise roller chain according to claim 1, wherein said elastic member is fitted to said inner peripheral surface of said roller and has an annular protrusion located substantially centrally between said opposite ends of said roller and projecting in a radial inward direction of said roller.

6. A low-noise roller chain according to claim 1, wherein said elastic member is fitted to said inner peripheral surface of said roller and has an annular recess located substantially centrally between said opposite ends of said roller, said annular recess forming an oil sump.

7. A low-noise roller chain according to claim 1, wherein said elastic member is fitted to said inner peripheral surface of said roller and has a plurality of axially extending ridge portions provided on an inner peripheral surface of said elastic member, each adjacent pair of said ridge portions defining therebetween an axial sump recess for holding a lubricant therein.

* * * * *